United States Patent
Armstrong

(10) Patent No.: US 11,742,495 B2
(45) Date of Patent: Aug. 29, 2023

(54) NI—FE BASED CATHODE FUNCTIONAL LAYERS FOR SOLID OXIDE ELECTROCHEMICAL CELLS

(71) Applicant: BLOOM ENERGY CORPORATION, San Jose, CA (US)

(72) Inventor: Tad Armstrong, Burlingame, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/052,701

(22) Filed: Nov. 4, 2022

(65) Prior Publication Data

US 2023/0144742 A1 May 11, 2023

Related U.S. Application Data

(60) Provisional application No. 63/301,291, filed on Jan. 20, 2022, provisional application No. 63/278,355, filed on Nov. 11, 2021.

(51) Int. Cl.
*H01M 4/90* (2006.01)
*H01M 4/86* (2006.01)
*H01M 4/88* (2006.01)
*H01M 8/1016* (2016.01)
*H01M 8/12* (2016.01)

(52) U.S. Cl.
CPC ....... *H01M 4/9016* (2013.01); *H01M 4/8673* (2013.01); *H01M 4/881* (2013.01); *H01M 4/8892* (2013.01); *H01M 8/1016* (2013.01); *H01M 2004/8689* (2013.01); *H01M 2008/1293* (2013.01); *H01M 2300/0071* (2013.01)

(58) Field of Classification Search
CPC .................................................. H01M 4/9016
See application file for complete search history.

(56) References Cited

U.S. PATENT DOCUMENTS

| | | | |
|---|---|---|---|
| 2010/0167164 A1 | 4/2010 | Reilly et al. | |
| 2011/0111327 A1* | 5/2011 | Ohmori | H01M 8/0228 428/629 |
| 2011/0183233 A1* | 7/2011 | Armstrong | C04B 35/486 429/495 |
| 2012/0270139 A1* | 10/2012 | Park | H01M 4/9033 252/182.1 |
| 2018/0019494 A1 | 1/2018 | Liu et al. | |
| 2020/0144634 A1* | 5/2020 | Ohara | H01M 8/0258 |

(Continued)

FOREIGN PATENT DOCUMENTS

| | | |
|---|---|---|
| CN | 102683721 B | 12/2015 |
| EP | 1950824 A1 | 7/2008 |
| EP | 2495790 A1 | 9/2012 |

(Continued)

OTHER PUBLICATIONS

JP2002151091 translation (Year: 2023).*

(Continued)

*Primary Examiner* — Brian R Ohara
(74) *Attorney, Agent, or Firm* — The Marbury Law Group PLLC

(57) ABSTRACT

A solid oxide electrochemical cell includes a solid oxide electrolyte, an anode located on a first side of the solid oxide electrolyte, and a cathode located on a second side of the solid oxide electrolyte. The cathode includes lanthanum nickel ferrite.

18 Claims, 7 Drawing Sheets

(56) References Cited

U.S. PATENT DOCUMENTS

2020/0194815 A1   6/2020  Lin et al.
2020/0358121 A1*  11/2020  Nishiwaki ................. C25B 9/23

FOREIGN PATENT DOCUMENTS

| EP | 3229304 A1 | | 10/2017 |
|----|---|---|---|
| JP | 2002151091 A | * | 5/2002 |
| JP | 2017076565 A | | 4/2017 |
| JP | 2021073164 A | | 5/2021 |
| KR | 20110121968 A | | 11/2011 |
| WO | WO2010078359 A2 | | 7/2010 |
| WO | WO2017075429 A1 | | 5/2017 |

OTHER PUBLICATIONS

European Office Communication, extended search report from the European Patent Office (EPO) for European Patent Office (EPO) for European Patent Application 22205502, dated Apr. 28, 2023, 7 pages.

\* cited by examiner

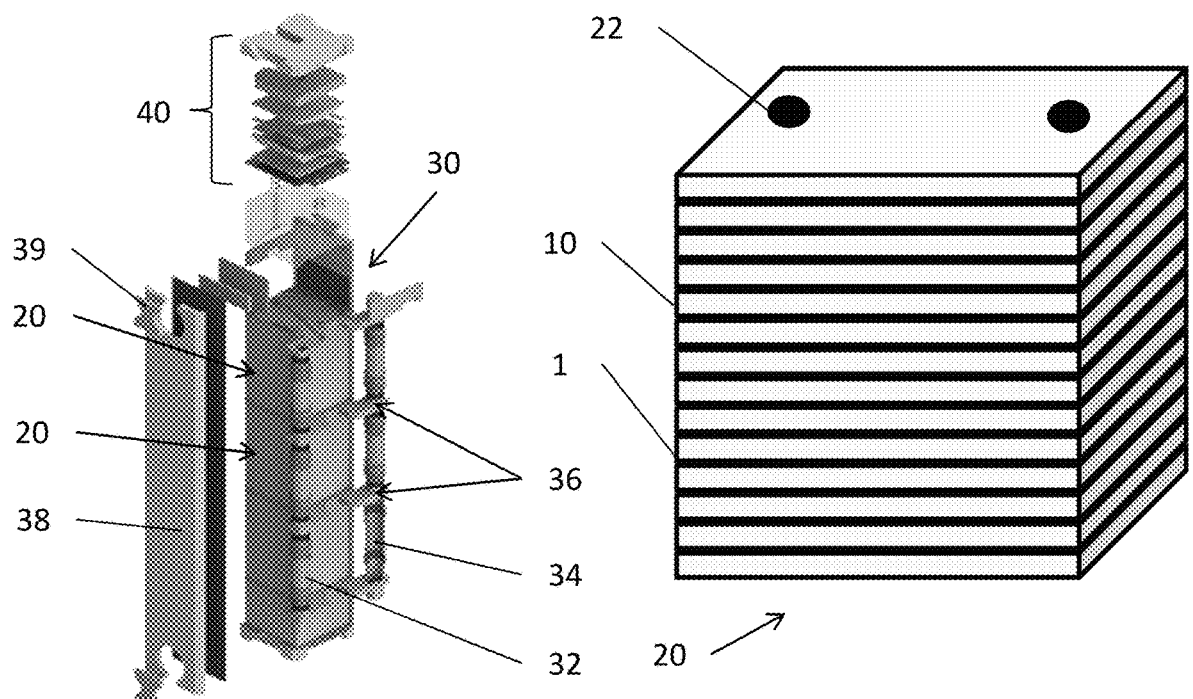
FIG. 1A
(Related Art)
FIG. 1B
(Related Art)
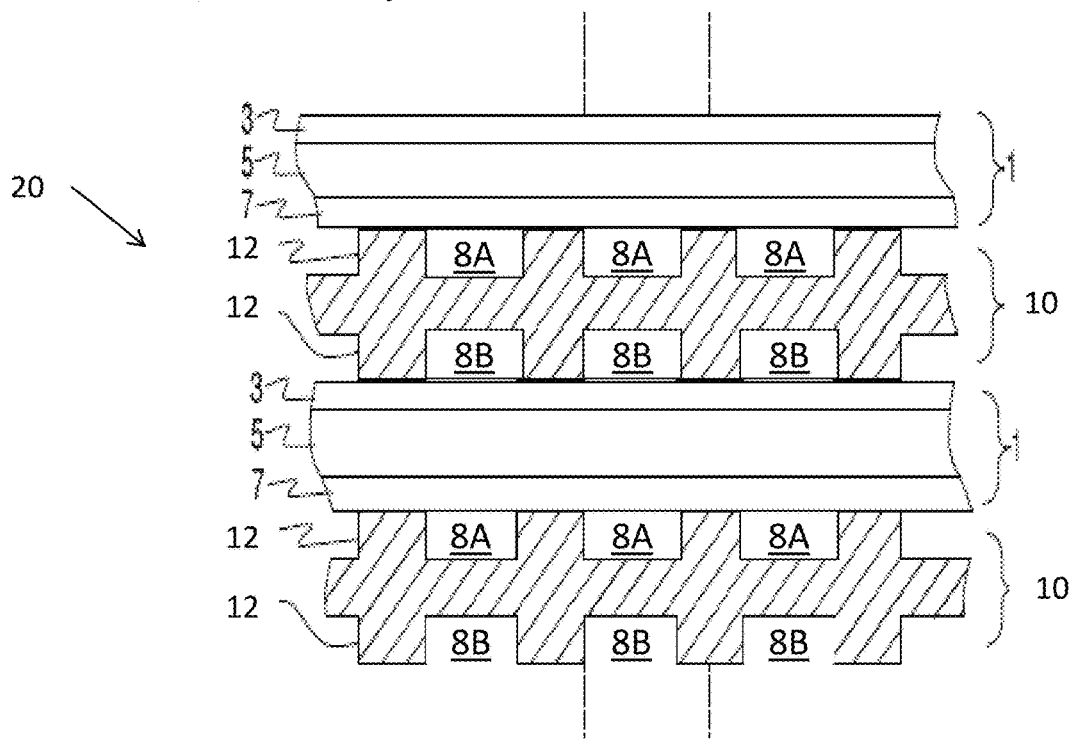
FIG. 1C
(Related Art)

600

700

NI—FE BASED CATHODE FUNCTIONAL LAYERS FOR SOLID OXIDE ELECTROCHEMICAL CELLS

FIELD

The present disclosure is directed to fuel cell stacks in general, and to electrochemical cell cathode materials in particular.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas flow separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air have to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

In one embodiment, a solid oxide electrochemical cell includes a solid oxide electrolyte, an anode located on a first side of the solid oxide electrolyte, and a cathode located on a second side of the solid oxide electrolyte, wherein the cathode comprises lanthanum nickel ferrite.

In another embodiment, a method of making a solid oxide electrochemical cell, comprises providing a solid oxide electrolyte, forming an anode on a first side of the solid oxide electrolyte, and forming a cathode on a second side of the solid oxide electrolyte, wherein the cathode comprises lanthanum nickel ferrite.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 1A is a perspective view of a conventional fuel cell column.

FIG. 1B is a perspective view of one counter-flow solid oxide fuel cell stack included in the column of FIG. 1A.

FIG. 1C is a side cross-sectional view of a portion of the stack of FIG. 1B.

DETAILED DESCRIPTION

Figure 2A:
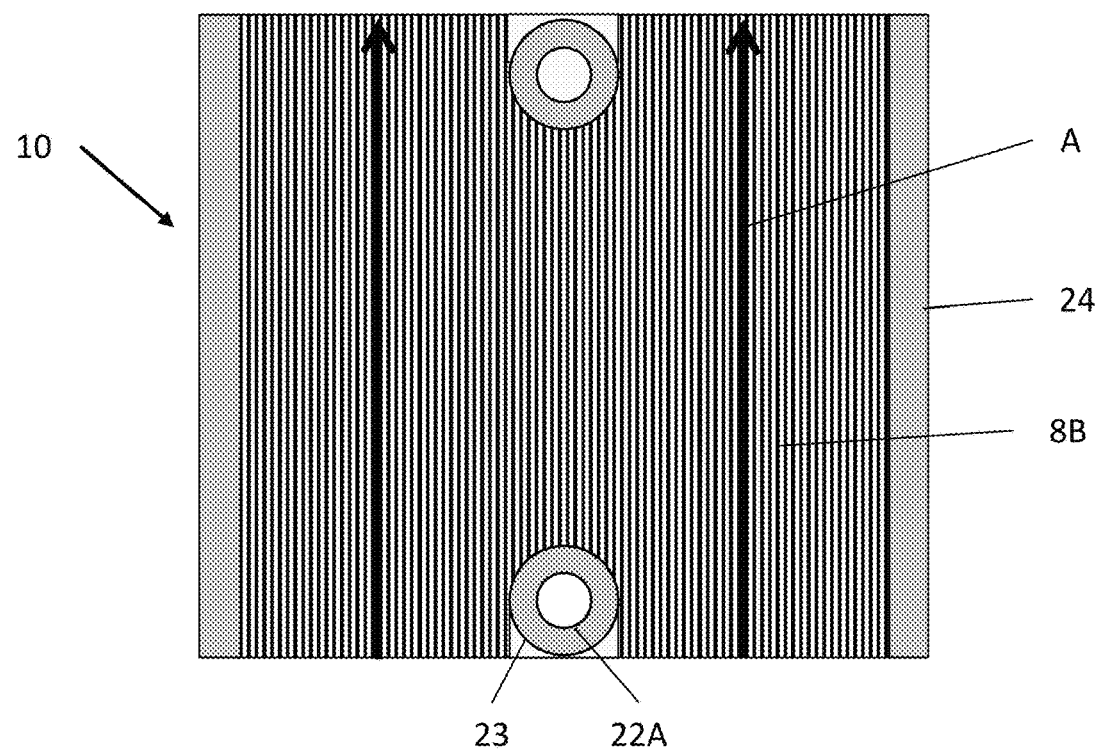
FIG. 2A is a top view of the air side of a conventional interconnect of the stack of FIG. 1B.

The various embodiments are described in detail with reference to the accompanying drawings. The drawings are not necessarily to scale, and are intended to illustrate various features of the invention. Wherever possible, the same reference numbers will be used throughout the drawings to refer to the same or like parts. References made to particular examples and implementations are for illustrative purposes, and are not intended to limit the scope of the invention or the claims.

Ranges can be expressed herein as from "about" one particular value, and/or to "about" another particular value.

When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

Some embodiments of the present disclosure are directed to SOFCs containing a cathode functional layer (CFL) having Ni—Fe based perovskite materials, such as lanthanum nickel ferrite. Such materials have improved stability in the presence of water vapor and/or chromium vapor and exhibit reduced area specific resistance degradation in comparison with CFLs based on lanthanum strontium manganite (LSM). Disclosed embodiments include CFLs having Ni—Fe containing perovskite materials La $Ni_{1-y}Fe_y O_{3-\delta}$ and La$_{1-x}$Ca), $Ni_{1-y}Fe_y O_{3-\delta}$, and mixtures of such Ni—Fe containing perovskite materials with other non-perovskite ionically conductive ceramic materials, such as scandia stabilized zirconia (SSZ), samaria-doped ceria (SDC), gadolinia-doped ceria (GDC), or zirconia stabilized with Sc—Ce—Y or Sc—Ce—Yb. The weight percent ratio of the Ni—Fe perovskite phase to the other ceramic phase may vary between 3:7 and 7:3. Disclosed embodiments further include Ni—Fe perovskite based CFL combined in a SOFC cathode with a cathode current collecting layer (CCL) including higher electrical conductivity perovskite materials, such as LSM (e.g., $(La_{1-x}Sr_x)_y MnO_{3-\delta}$), lanthanum strontium cobaltite (LSCo) or lanthanum strontium cobalt ferrite (LSCF, e.g., $La_{1-x} Sr_x Co_{1-y} Fe_y O_{3-\delta}$).

FIG. 1A is a perspective view of a conventional fuel cell column 30, FIG. 1B is a perspective view of one counter-flow SOFC stack 20 included in the column 30 of FIG. 1A, and FIG. 1C is a side cross-sectional view of a portion of the stack 20 of FIG. 1B.

Referring to FIGS. 1A and 1B, the column 30 may include one or more stacks 20, a fuel inlet conduit 32, an anode exhaust conduit 34, and anode feed/return assemblies 36 (e.g., anode splitter plates (ASP's) 36). The column 30 may also include side baffles 38 and a compression assembly 40. The side baffles 38 may be connected to the compression assembly 40 and an underlying stack component (not shown) by ceramic connectors 39. The fuel inlet conduit 32 is fluidly connected to the ASP's 36 and is configured to provide the fuel feed to each ASP 36, and anode exhaust conduit 34 is fluidly connected to the ASP's 36 and is configured to receive anode fuel exhaust from each ASP 36.

The ASP's 36 are disposed between the stacks 20 and are configured to provide a hydrocarbon fuel containing fuel feed to the stacks 20 and to receive anode fuel exhaust from the stacks 20. For example, the ASP's 36 may be fluidly connected to internal fuel riser channels 22 formed in the stacks 20, as discussed below.

Referring to FIG. 1C, the stack 20 includes multiple fuel cells 1 that are separated by interconnects 10, which may also be referred to as gas flow separator plates or bipolar plates. Each fuel cell 1 includes a cathode electrode 3, a solid oxide electrolyte 5, and an anode electrode 7.

Each interconnect 10 electrically connects adjacent fuel cells 1 in the stack 20. In particular, an interconnect 10 may electrically connect the anode electrode 7 of one fuel cell 1 to the cathode electrode 3 of an adjacent fuel cell 1. FIG. 1C shows that the lower fuel cell 1 is located between two interconnects 10.

Each interconnect 10 includes ribs 12 that at least partially define fuel channels 8A and air channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 20, there may be an air end plate or fuel end plate (not shown) for providing air or fuel, respectively, to the end electrode.

Figure 2B:
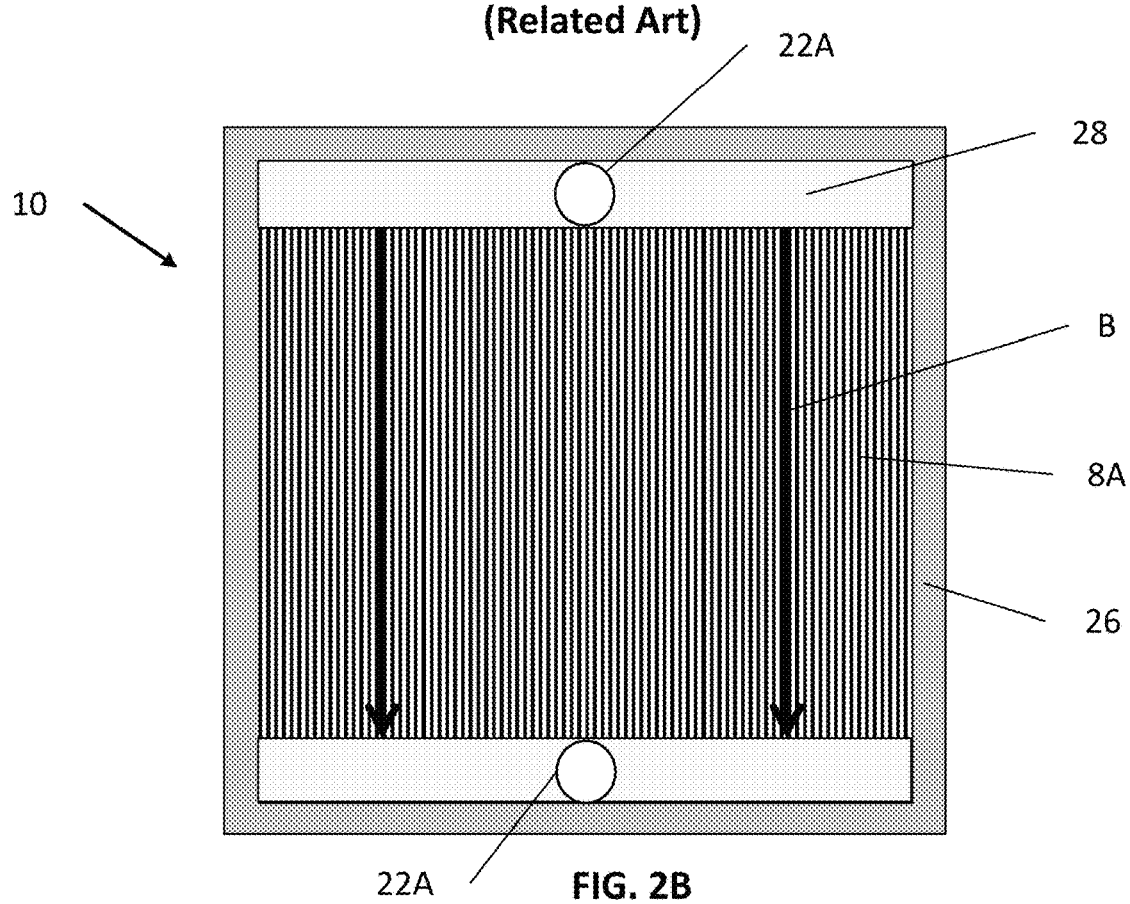
FIG. 2B is a top view of the fuel side of the conventional interconnect of the stack of FIG. 1B.

FIG. 2A is a top view of the air side of the conventional interconnect 10, and FIG. 2B is a top view of a fuel side of the interconnect 10. Referring to FIGS. 1C and 2A, the air side includes the air channels 8B. Air flows through the air channels 8B to a cathode electrode 3 of an adjacent fuel cell 1. In particular, the air may flow across the interconnect 10 in a first direction A as indicated by the arrows.

Ring seals 23 may surround fuel holes 22A of the interconnect 10, to prevent fuel from contacting the cathode electrode. Peripheral strip-shaped seals 24 are located on peripheral portions of the air side of the interconnect 10. The seals 23, 24 may be formed of a glass material. The peripheral portions may be in the form of an elevated plateau which does not include ribs or channels. The surface of the peripheral regions may be coplanar with tops of the ribs 12.

Referring to FIGS. 1C and 2B, the fuel side of the interconnect 10 may include the fuel channels 8A and fuel manifolds 28 (e.g., fuel plenums). Fuel flows from one of the fuel holes 22A, into the adjacent manifold 28, through the fuel channels 8A, and to an anode 7 of an adjacent fuel cell 1. Excess fuel may flow into the other fuel manifold 28 and then into the adjacent fuel hole 22A. In particular, the fuel may flow across the interconnect 10 in a second direction B, as indicated by the arrows. The second direction B may be perpendicular to the first direction A (see FIG. 2A).

A frame-shaped seal 26 is disposed on a peripheral region of the fuel side of the interconnect 10. The peripheral region may be an elevated plateau which does not include ribs or channels. The surface of the peripheral region may be coplanar with tops of the ribs 12.

Accordingly, a conventional counter-flow fuel cell column, as shown in FIGS. 1A, 1B, 1C, 2A, and 2B, may include complex fuel distribution systems (fuel rails and anode splitter plates). In addition, the use of an internal fuel riser may require holes in fuel cells and corresponding seals, which may reduce an active area thereof and may cause cracks in the ceramic electrolytes of the fuel cells 1.

The fuel manifolds 28 may occupy a relatively large region of the interconnect 10, which may reduce the contact area between the interconnect 10 and an adjacent fuel cell by approximately 10%. The fuel manifolds 28 are also relatively deep, such that the fuel manifolds 28 represent relatively thin regions of the interconnect 10. Since the interconnect 10 is generally formed by a powder metallurgy compaction process, the density of fuel manifold regions may approach the theoretical density limit of the interconnect material. As such, the length of stroke of a compaction press used in the compaction process may be limited due to the high-density fuel manifold regions being incapable of being compacted further. As a result, the density achieved elsewhere in the interconnect 10 may be limited to a lower level by the limitation to the compaction stroke. The resultant density variation may lead to topographical variations, which may reduce the amount of contact between the interconnect 10 a fuel cell 1 and may result in lower stack yield and/or performance.

Another important consideration in fuel cell system design is in the area of operational efficiency. Maximizing fuel utilization is a key factor to achieving operational efficiency. Fuel utilization is the ratio of how much fuel is consumed during operation, relative to how much is delivered to a fuel cell. An important factor in preserving fuel cell cycle life may be avoiding fuel starvation in fuel cell active areas, by appropriately distributing fuel to the active areas. If there is a maldistribution of fuel such that some flow field channels receive insufficient fuel to support the electrochemical reaction that would occur in the region of that channel, it may result in fuel starvation in fuel cell areas adjacent that channel. In order to distribute fuel more uniformly, conventional interconnect designs include channel depth variations across the flow field. This may create complications not only in the manufacturing process, but may also require complex metrology to measure these dimensions accurately. The varying channel geometry may be constrained by the way fuel is distributed through fuel holes and distribution manifolds.

One possible solution to eliminate this complicated geometry and the fuel manifold is to have a wider fuel opening to ensure much more uniform fuel distribution across the fuel flow field. Since fuel manifold formation is a factor in density variation, elimination of fuel manifolds should enable more uniform interconnect density and permeability. Accordingly, there is a need for improved interconnects that provide for uniform contact with fuel cells, while also uniformly distributing fuel to the fuel cells without the use of conventional fuel manifolds.

Owing to the overall restrictions in expanding the size of a hotbox of a fuel cell system, there is also a need for improved interconnects designed to maximize fuel utilization and fuel cell active area, without increasing the footprint of a hotbox.

Figure 3A:
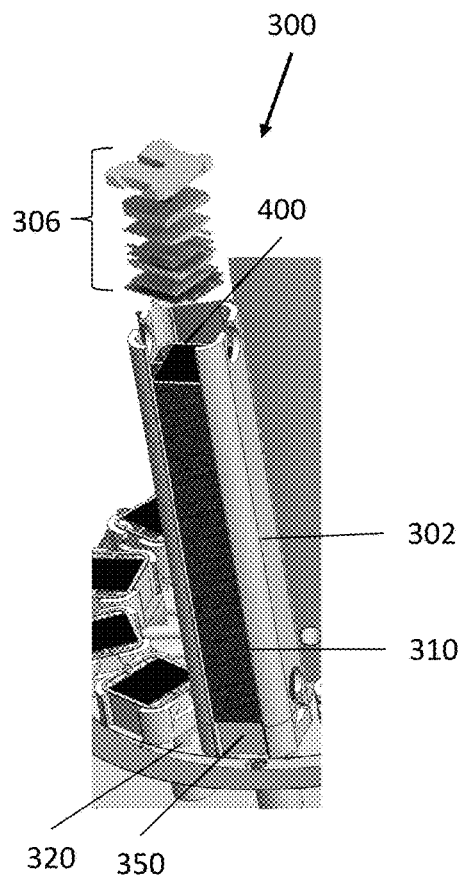
FIG. 3A is a perspective view of a fuel cell stack, according to various embodiments of the present disclosure.
Figure 3C:
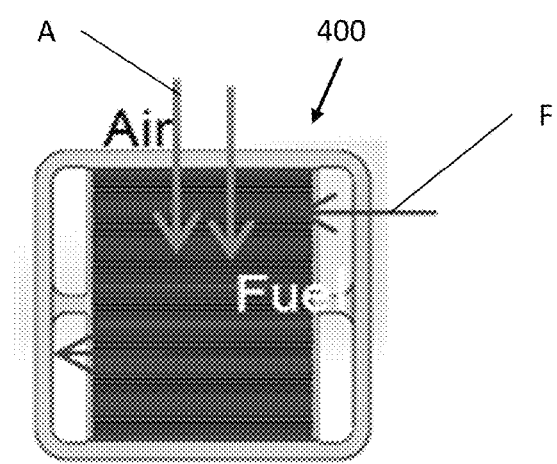
FIG. 3C is a top view of the fuel side of an interconnect included in the stack of FIG. 3A, according to various embodiments of the present disclosure.
Figure 3D:
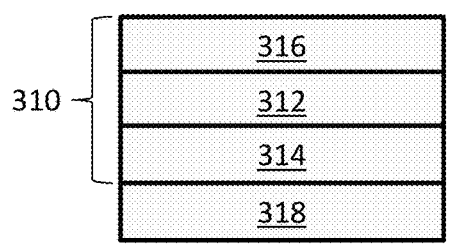
FIG. 3D is a schematic view of a fuel cell included in the stack of FIG. 3A, according to various embodiments of the present disclosure.
Figure 3B:
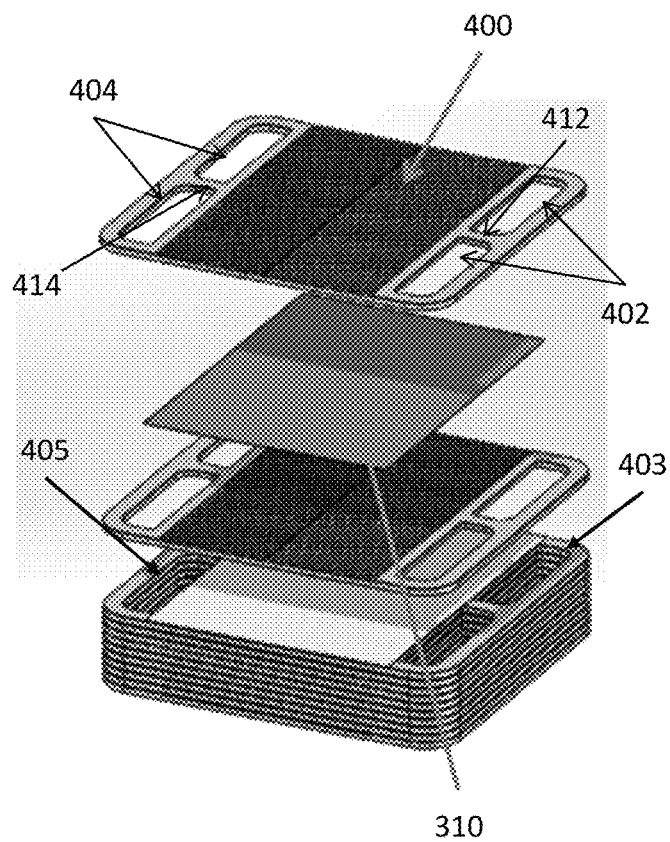
FIG. 3B is an exploded perspective view of a portion of the stack of FIG. 3A, according to various embodiments of the present disclosure.

FIG. 3A is a perspective view of a fuel cell stack 300, according to various embodiments of the present disclosure, FIG. 3B is an exploded perspective view of a portion of the stack 300 of FIG. 3A, FIG. 3C is a top view of the fuel side of an interconnect 400 included in the stack 300, and FIG. 3D is a schematic view of a fuel cell included in the stack 300.

Referring to FIGS. 3A-3D, the fuel cell stack 300, which may also be referred to as a fuel cell column because it lacks ASP's, includes multiple fuel cells 310 that are separated by interconnects 400, which may also be referred to as gas flow separator plates or bipolar plates. One or more stacks 300 may be thermally integrated with other components of a fuel cell power generating system (e.g., one or more anode tail gas oxidizers, fuel reformers, fluid conduits and manifolds, etc.) in a common enclosure or "hotbox."

The interconnects 400 are made from an electrically conductive metal material. For example, the interconnects 400 may comprise a chromium alloy, such as a Cr—Fe alloy. The interconnects 400 may typically be fabricated using a powder metallurgy technique that includes pressing and sintering a Cr—Fe powder, which may be a mixture of Cr and Fe powders or an Cr—Fe alloy powder, to form a Cr—Fe interconnect in a desired size and shape (e.g., a "net shape" or "near net shape" process). A typical chromium-alloy interconnect 400 comprises more than about 90% chromium by weight, such as about 94-96% (e.g., 95%) chromium by weight. An interconnect 400 may also contain less than about 10% iron by weight, such as about 4-6% (e.g., 5%) iron by weight, may contain less than about 2% by weight, such as about zero to 1% by weight, of other materials, such as yttrium or yttria, as well as residual or unavoidable impurities.

Each fuel cell 310 may include a solid oxide electrolyte 312, an anode 314, and a cathode 316. In some embodiments, the anode 314 and the cathode 316 may be printed on the electrolyte 312. In other embodiments, a conductive layer 318, such as a nickel mesh, may be disposed between the anode 314 and an adjacent interconnect 400. The fuel cell 310 does not include through-holes, such as the fuel holes of conventional fuel cells. Therefore, the fuel cell 310 avoids cracks that may be generated due to the presence of such through-holes.

An upper most interconnect 400 and a lowermost interconnect 400 of the stack 300 may be different ones of an air end plate or fuel end plate including features for providing air or fuel, respectively, to an adjacent end fuel cell 310. As used herein, an "interconnect" may refer to either an interconnect located between two fuel cells 310 or an end plate located at an end of the stack and directly adjacent to only one fuel cell 310. Since the stack 300 does not include ASPs and the end plates associated therewith, the stack 300 may include only two end plates. As a result, stack dimensional variations associated with the use of intra-column ASPs may be avoided.

The stack 300 may include side baffles 302, a fuel plenum 350, and a compression assembly 306. The side baffles 302 may be formed of a ceramic material and may be disposed on opposing sides of the fuel cell stack 300 containing stacked fuel cells 310 and interconnects 400. The side baffles 302 may connect the fuel plenum 350 and the compression assembly 306, such that the compression assembly 306 may apply pressure to the stack 300. The side baffles 302 may be curved baffle plates, such each baffle plate covers at least portions of three sides of the fuel cell stack 300. For example, one baffle plate may fully cover the fuel inlet riser side of the stack 300 and partially covers the adjacent front and back sides of the stack, while the other baffle plate fully covers the fuel outlet riser side of the stack and partially covers the adjacent portions of the front and back sides of the stack. The remaining uncovered portions for the front and back sides of the stack allow the air to flow through the stack 300. The curved baffle plates provide an improved air flow control through the stack compared to the conventional baffle plates 38 which cover only one side of the stack. The fuel plenum 350 may be disposed below the stack 300 and may be configured to provide a hydrogen-containing fuel feed to the stack 300, and may receive an anode fuel exhaust from the stack 300. The fuel plenum 350 may be connected to fuel inlet and outlet conduits 320 which are located below the fuel plenum 350.

Each interconnect 400 electrically connects adjacent fuel cells 310 in the stack 300. In particular, an interconnect 400 may electrically connect the anode electrode of one fuel cell 310 to the cathode electrode of an adjacent fuel cell 310. As shown in FIG. 3C, each interconnect 400 may be configured to channel air in a first direction A, such that the air may be provided to the cathode of an adjacent fuel cell 310. Each interconnect 400 may also be configured to channel fuel in a second direction F, such that the fuel may be provided to the anode of an adjacent fuel cell 310. Directions A and F may be perpendicular, or substantially perpendicular. As such, the interconnects 400 may be referred to as cross-flow interconnects.

The interconnect 400 may include fuel holes that extend through the interconnect 400 and that are configured for fuel distribution. For example, the fuel holes may include one or more fuel inlets 402 and one or more fuel (e.g., anode exhaust) outlets 404, which may also be referred to as anode exhaust outlets 404. The fuel inlets and outlets 402, 404 may be disposed outside of the perimeter of the fuel cells 310. As such, the fuel cells 310 may be formed without corresponding through-holes for fuel flow. The combined length of the fuel inlets 402 and/or the combined length of the fuel outlets 404 may be at least 75% of a corresponding length of the interconnect 400 e.g., a length taken in direction A.

In one embodiment, each interconnect 400 contains two fuel inlets 402 separated by a neck portion 412 of the interconnect 400, as shown in FIG. 3B. However, more than two fuel inlets 402 may be included, such as three to five inlets separated by two to four neck portions 412. In one embodiment, each interconnect 400 contains two fuel outlets 404 separated by a neck portion 414 of the interconnect 400, as shown in FIG. 3B. However, more than two fuel outlets 404 may be included, such as three to five outlets separated by two to four neck portions 414.

The fuel inlets 402 of adjacent interconnects 400 may be aligned in the stack 300 to form one or more fuel inlet risers 403. The fuel outlets 404 of adjacent interconnects 400 may be aligned in the stack 300 to form one or more fuel outlet risers 405. The fuel inlet riser 403 may be configured to distribute fuel received from the fuel plenum 350 to the fuel cells 310. The fuel outlet riser 405 may be configured to provide anode exhaust received from the fuel cells 310 to the fuel plenum 350.

Unlike the flat related art side baffles 38 of FIG. 1A, the side baffles 302 may be curved around edges of the interconnects 400. In particular, the side baffles 302 may be disposed around the fuel inlets 402 and outlets 404 of the interconnects 400. Accordingly, the side baffles may more efficiently control air flow through air channels of the interconnects 400, which are exposed between the side baffles 302 and are described in detail with regard to FIGS. 4A and 4B.

In various embodiments, the stack 300 may include at least 30, at least 40, at least 50, or at least 60 fuel cells, which may be provided with fuel using only the fuel risers 403, 405. In other words, as compared to a conventional fuel cell system, the cross-flow configuration allows for a large number of fuel cells to be provided with fuel, without the need for ASP's or external stack fuel manifolds, such as external conduits 32, 34 shown in FIG. 1A.

Each interconnect 400 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 400 may comprise a metal (e.g., a chromium-iron alloy, such as 4-6 weight percent iron, optionally 1 or less weight percent yttrium and balance chromium alloy), and may electrically connect the anode or fuel-side of one fuel cell 310 to the cathode or air-side of an adjacent fuel cell 310. An electrically conductive contact layer, such as a nickel contact layer (e.g., a nickel mesh), may be provided between anode and each interconnect 400. Another optional electrically conductive contact layer may be provided between the cathode electrodes and each interconnect 400.

A surface of an interconnect 400 that in operation is exposed to an oxidizing environment (e.g., air), such as the cathode-facing side of the interconnect 400, may be coated with a protective coating layer in order to decrease the growth rate of a chromium oxide surface layer on the interconnect and to suppress evaporation of chromium vapor species which can poison the fuel cell cathode. Typically, the coating layer, which can comprise a perovskite such as LSM, may be formed using a spray coating or dip coating process. Alternatively, other metal oxide coatings, such as a spinel, such as an $(Mn, Co)_3O_4$ spinel (MCO), can be used instead of or in addition to LSM. Any spinel having the composition $Mn_{2-x}$, $Co_{1+x}O_4$ ($0 \le x \le 1$) or written as $z(Mn_3O_4)+(1-z)(Co_3\ O_4)$, where ($\frac{1}{3} \le z \le \frac{2}{3}$) or written as $(Mn, Co)_3\ O_4$ may be used. In other embodiments, a mixed layer of LSM and MCO, or a stack of LSM and MCO layers may be used as the coating layer.

Figure 4A:
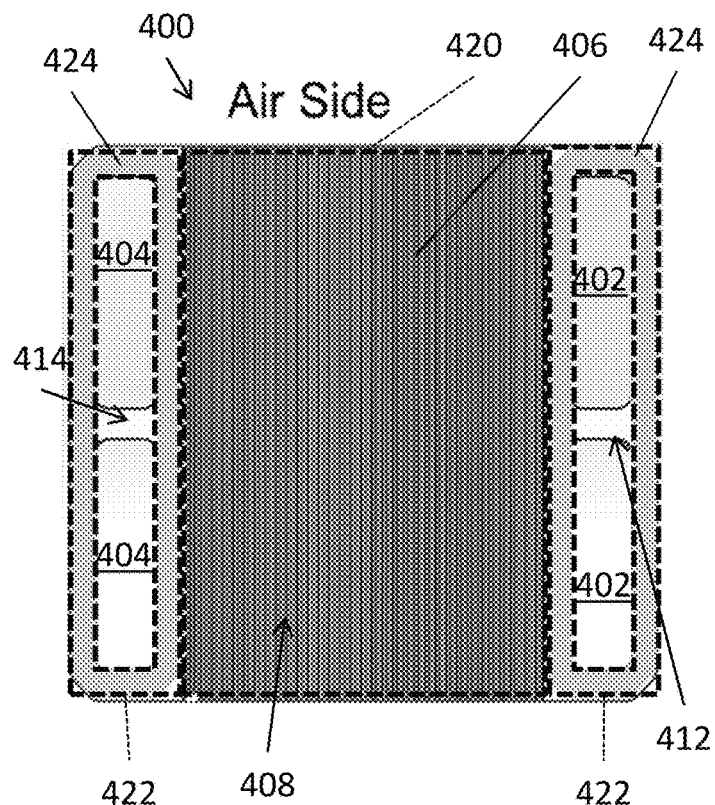
FIG. 4A is a plan view showing an air side of the cross-flow interconnect of FIG. 3C, according to various embodiments of the present disclosure.
Figure 4B:
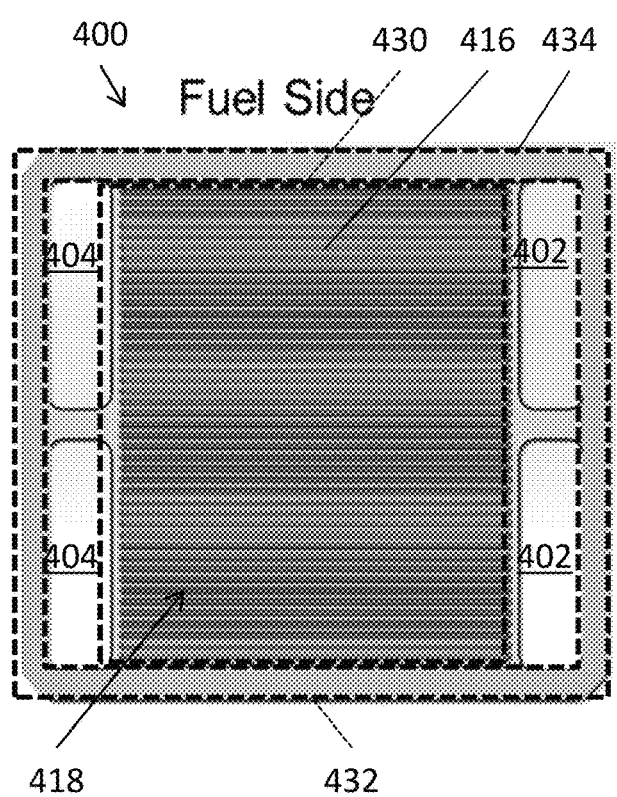
FIG. 4B is a plan view showing a fuel side of the cross-flow interconnect of FIG. 3C, according to various embodiments of the present disclosure.

FIGS. 4A and 4B are plan views showing, respectively, an air side and a fuel side of the cross-flow interconnect 400, according to various embodiments of the present disclosure. Referring to FIG. 4A, the air side of the interconnect 400 may include ribs 406 configured to at least partially define air channels 408 configured to provide air to the cathode of a fuel cell 310 disposed thereon. The air side of the interconnect 400 may be divided into an air flow field 420 including the air channels 408, and riser seal surfaces 422 disposed on two opposing sides of the air flow field 420. One of the riser seal surfaces 422 may surround the fuel inlets 402 and the other riser seal surface 422 may surround the fuel outlets 404. The air channels 408 and ribs 406 may extend completely across the air side of the interconnect 400, such that the air channels 408 and ribs 406 terminate at opposing peripheral edges of the interconnect 400. In other words, when assembled into a stack 300, opposing ends of the air channels 408 and ribs 406 are disposed on opposing (e.g., front and back) outer surfaces of the stack, to allow the blown air to flow through the stack. Therefore, the stack may be externally manifolded for air.

Riser seals 424 may be disposed on the riser seal surface 422. For example, one riser seal 424 may surround the fuel inlets 402, and one riser seal 424 may surround the fuel outlets 404. The riser seals 424 may prevent fuel and/or anode exhaust from entering the air flow field 420 and contacting the cathode of the fuel cell 310. The riser seals 424 may also operate to prevent fuel from leaking out of the fuel cell stack 100 (see FIG. 3A).

Referring to FIG. 4B, the fuel side of the interconnect 400 may include ribs 416 that at least partially define fuel channels 418 configured to provide fuel to the anode of a fuel cell 310 disposed thereon. The fuel side of the interconnect 400 may be divided into a fuel flow field 430 including the fuel channels 418, and an perimeter seal surface 432 surrounding the fuel flow field 430 and the fuel inlets and outlets 402, 404. The ribs 416 and fuel channels 418 may extend in a direction that is perpendicular or substantially perpendicular to the direction in which the air-side channels 408 and ribs 406 extend.

A frame-shaped perimeter seal 434 may be disposed on the perimeter seal surface 432. The perimeter seal 434 may be configured to prevent air entering the fuel flow field 430 and contacting the anode on an adjacent fuel cell 310. The perimeter seal 434 may also operate to prevent fuel from exiting the fuel risers 403, 405 and leaking out of the fuel cell stack 300 (see FIGS. 3A and 3B).

The seals 424, 434 may comprise a glass or ceramic seal material. The seal material may have a low electrical conductivity. In some embodiments, the seals 424, 434 may be formed by printing one or more layers of seal material on the interconnect 400, followed by sintering.

Figure 5:
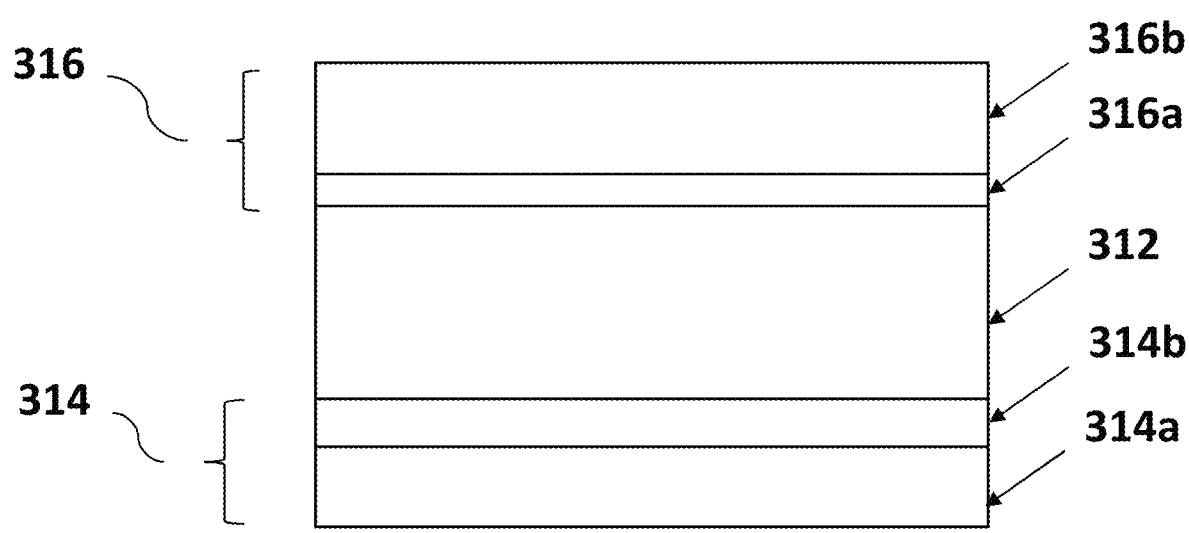
FIG. 5 is a schematic view of an electrochemical cell, according to various embodiments of the present disclosure.

FIG. 5 is a schematic view of an electrochemical cell 500, according to various embodiments of the present disclosure. The electrochemical cell 500 may comprise a solid oxide fuel cell (SOFC) or a solid oxide electrolyzer cell (SOEC). In a solid oxide electrolyzer cell, a voltage is applied between the anode and the cathode and a water containing stream is provided to the anode. The water is electrolyzed into hydrogen and oxygen at the anode. The oxygen ions are transported across the electrolyte to the cathode. An oxygen containing exhaust stream is provided from the cathode. A hydrogen containing stream is provided from the anode.

The electrochemical cell 500 contains a solid oxide electrolyte 312, an anode 314 having an anode current collecting layer 314a and an anode functional layer 314b, and a cathode 316 having a CFL 316a and a cathode current collecting layer (CCL) 316b.

The electrolyte 312 may comprise an ionically conductive ceramic, such as doped zirconia, doped ceria, and/or any other suitable ionically conductive ceramic oxide material. For example, the electrolyte 312 may include yttria-stabilized zirconia (YSZ), yttria-ceria-stabilized zirconia (YCSZ), scandia-stabilized zirconia (SSZ), ytterbia-ceria-scandia-stabilized zirconia (YbCSSZ), or blends thereof. In the YbCSSZ, scandia may be present in an amount equal to 9 to 11 mol %, such as 10 mol %, ceria may present in amount greater than 0 and equal to or less than 3 mol %, for example 0.5 mol % to 2.5 mol %, such as 1 mol %, and ytterbia may be present in an amount greater than 0 and equal to or less than 2.5 mol %, for example 0.5 mol % to 2 mol %, such as 1 mol %, as disclosed in U.S. Pat. No. 8,580,456, which is incorporated herein, by reference. In the YCSZ, yttria may be present in an amount equal to 8 to 10 mol %, and optionally ceria may be present in an amount equal to 0 to 3 mol %. In other embodiments, the electrolyte may include samaria, gadolinia, or yttria-doped ceria.

The anode 314 is located over a first side of the electrolyte 312. The anode functional layer 314b is located between the anode current collecting layer 314a and the first side of the electrolyte 312. The anode 314 may include at least one cermet that includes a metallic phase and a ceramic phase. The metallic phase may include a metal catalyst and the ceramic phase may include one or more ceramic materials. The ceramic phase of the anode 40 may comprise any suitable ionically conductive ceramic material, such as a doped ceria and/or a doped zirconia. For example, the ceramic phase may include, but is not limited to gadolinia-doped ceria (GDC), samaria-doped ceria (SDC), praseodymia doped ceria (PDC), ytterbia-doped ceria (YDC), scandia-stabilized zirconia (SSZ), ytterbia-ceria-scandia-stabilized zirconia (YCSSZ), yttria stabilized zirconia (YSZ), or the like. For example, the ceramic material may comprise a doped ceria, such as samaria, gadolinia and/or praseodymia doped ceria, for example 10 to 20 mol % of $Sm_2O_3$, $Gd_2O_3$, and/or $Pr_2O_3$ doped $CeO_2$. The metallic phase may include a metal catalyst, such as nickel (Ni), which operates as an electron conductor. The metal catalyst may be in a metallic state or may be in an oxide state. For example, the metal catalyst forms a metal oxide when it is in an oxidized state. Thus, the anode may be annealed in a reducing atmosphere prior to and/or during operation of the fuel cell, to reduce the metal catalyst to a metallic state. The anode functional layer 314b contains a lower ratio of the nickel containing phase to the ceramic phase than the anode current collecting layer 314a.

The cathode 316 is located over the second side of the electrolyte 312. The CFL 316a is located between the CCL 316b and the second side of the electrolyte 312.

Comparative (e.g., conventional) cathodes of SOFCs operating in the temperature range of 750° C.-850° C. may include a mixed electric-ionic conducting perovskite LSM phase, for example, $La_{0.8} Sr_{0.2} Mn O_{3-\delta}$, where $0 \leq \delta \leq 0.1$, or an A-site deficient LSM perovskite phase, such as $(La_{0.8} Sr_{0.2})_{0.97} MnO_{3-\delta}$. While this material may be suitable for a CCL, there may be some stability issues associated with the use of LSM for a CFL. For example, water vapor or chromium vapor $(CrO_2(OH)_2)$ may degrade the electrocatalytic properties of LSM. Without wishing to be bound by a particular theory, it is believed that the surface of LSM may dissociate in the presence of water, leading to enriched strontium areas and deficient manganese regions, both of which may affect surface catalytic properties. Furthermore, it is believed that Mn in the LSM may react with chromium vapor to form Mn—Cr spinel phases, which may act to decrease surface catalytic properties and which may block three-phase boundaries in the CFL. Improved electrochemical properties (e.g., stability and/or catalytic activity) are desirable in the CFL where three-phase boundaries reside, and oxide-ion and charge-transfer processes occur.

Since both Sr and Mn in the LSM perovskite are prone to reactions with either water or chromium gas species, the present inventor realized that it may be desirable to use a CFL containing an electrochemically active and electrically conducting perovskite phase without Sr and Mn (other than unavoidable impurities or atoms diffused from the CCL during SOFC fabrication), or with decreased Sr and Mn content. The Sr and/or Mn may be replaced entirely or partially in the perovskite material with nickel and iron. Thus, Sr and/or Mn may be omitted entirely or at least partially in the CFL 316a. Thus, the CFL 316a may comprise a lanthanum nickel ferrite perovskite material.

Two embodiment CFL lanthanum nickel ferrite perovskite material systems that exclude Sr and Mn comprise $La Ni_{1-y} Fe_y O_{3-\delta}$ and $La_{1-x} Ca_x Ni_{1-y} Fe_y O_{3-\delta}$, where $0 \leq \delta \leq 0.1$ In the first system, suitable compositions include $La Ni_{1-y} Fe_y O_{3-\delta}$ where $0.2 < y < 1$, such as $0.2 < y < 0.8$, for example $0.4 < y < 0.6$. The materials of this system may have advantageous stability and electrochemical properties. Non-limiting examples include $La Ni_{0.4} Fe_{0.6} O_{3-\delta}$, $La Ni_{0.5} Fe_{0.5} O_{3-\delta}$, and $La Ni_{0.6} Fe_{0.4} O_{3-\delta}$. In the second system, a portion of La may be substituted with Ca. Suitable compositions include $La_{1-x} Ca_x Ni_{1-y} Fe_y O_{3-\delta}$ where $0.05 < x < 0.3$, such as $0.1 < x < 0.2$, and $0.3 < y < 0.7$, such as $0.5 < y < 0.7$. Non-limiting examples include $La_{0.8} Ca_{0.2} Ni_{0.3} Fe_{0.7} O_{3-\delta}$ and $La_{0.9} Ca_{0.1} Ni_{0.4} Fe_{0.6} O_{3-\delta}$. These lanthanum nickel ferrite perovskite materials may have a cubic perovskite lattice structure, and phases of $La Ni_{0.4} Fe_{0.6} O_{3-\delta}$, $La_{0.8} Ca_{0.2} Ni_{0.3} Fe_{0.7} O_{3-\delta}$, and $La_{0.9} Ca_{0.1} Ni_{0.4} Fe_{0.6} O_{3-\delta}$ are confirmed by x-ray power diffraction spectroscopy to be cubic.

The electric conductivity of the above lanthanum nickel ferrite perovskite materials is lower than strontium containing perovskites materials, such as LSM, lanthanum strontium cobaltite (LSCo), and lanthanum strontium cobalt ferrite (LSCF). Therefore, the lanthanum nickel ferrite perovskite material is preferably used for the CFL 316a rather than for the CCL 316b, while the above strontium containing perovskite materials (e.g., LSM, LSCo or LSCF) are used for the CCL 316b. The lanthanum nickel ferrite perovskite material may be fabricated by forming a porous/sintered CFL 316a on the electrolyte 312, followed by forming the CCL 316b on the CFL 316a.

In another embodiment, the lanthanum nickel ferrite perovskite material may be mixed with a non-perovskite ionically conductive ceramic material, such as scandia stabilized zirconia (SSZ), Sm-doped ceria (SDC), Gd-doped ceria (GDC), or zirconia stabilized with Sc—Ce, Sc—Ce—Y or Sc—Ce—Yb. Specific examples of the non-perovskite ionically conductive ceramic material include 89 mol % $ZrO_2$-10 mol % $Sc_2 O_3$-1 mol % $CeO_2$ ("10Sc1Ce"), $Ce_{0.8} Sm_{0.2} O_{2-\delta}$, $Ce_{0.8} Gd_{0.2} O_{2-\delta}$, 88 mol % $ZrO_2$-10 mol % $Sc_2 O_3$-1 mol % $Yb_2O_3$-1 mol % $CeO_2$ ("10Sc1Ce1Yb"), and 88 mol % $ZrO_2$-10 mol % $Sc_2 O_3$-1 mol % $YO_3$-1 mol % $CeO_2$ ("10Sc1Ce1Y"). In general the Sc—Ce—Y stabilized zirconia ("YbCSSZ", which includes the above described 10Sc1Ce1Yb) may be mixed with the lanthanum nickel ferrite perovskite material. In the YbCSSZ stabilized zirconia, scandia may be present in an amount equal to 9 to 11 mol %, such as 10 mol %, ceria may present in amount greater than 0 and equal to or less than 3 mol %, for example 0.5 mol % to 2.5 mol %, such as 1 mol %, and ytterbia may be present in an amount greater than 0 and equal to or less than 2.5 mol %, for example 0.5 mol % to 2 mol %, such as 1 mol %.

The weight ratio of the lanthanum nickel ferrite perovskite material to the non-perovskite ionically conductive ceramic material in the CFL may be 3:7 to 7:3. For example, CFL compositions may include 30 wt. % lanthanum nickel ferrite and 70 wt. % 10Sc1Ce1Yb, 40 wt. % lanthanum nickel ferrite and 60 wt. % 10Sc1Ce1Yb, 50 wt. % lanthanum nickel ferrite and 50 wt. % 10Sc1Ce1Yb, and 60 wt. % lanthanum nickel ferrite and 40 wt. % 10Sc1Ce1Yb. In another example, CFL compositions with SDC may include 30 wt. % lanthanum nickel ferrite and 70 wt. % SDC, 40 wt. % lanthanum nickel ferrite and 60 wt. % SDC, 50 wt. % lanthanum nickel ferrite and 50 wt. % SDC, and 60 wt. % lanthanum nickel ferrite and 40 wt. % SDC.

The CFL 316a may be printed (e.g., screen printed using an ink) and sintered on top of the second side of the electrolyte 312. The CCL 316b may be printed (e.g., screen printed using an ink) and sintered on top of the CFL 316a and may function largely as a current collecting layer. The CCL 316b may include LSM, LSCo, or LSCF. For example, LSM compositions may include A-site deficient $(La_{1-x} Sr_x)_y MnO_{3-\delta}$ where $0.1<x<0.3$ and $0.94<y<0.99$, such as $(La_{0.8} Sr_{0.2})_{0.98} MnO_{3-\delta}$.

Exemplary cathodes 316 may include a CCL 316b of $(La_{0.8}Sr_{0.2})_{0.98}MnO_{3-\delta}$ with a CFL 316a of $LaNi_{0.4} Fe_{0.6} O_{3-\delta}$, a CCL of $(La_{0.8} Sr_{0.2})_{0.98} MnO_{3-\delta}$ with a CFL of $La_{0.8} Ca_{0.2} Ni_{0.3}Fe_{0.7}$, and a CCL of $(La_{0.8} Sr_{0.2})_{0.98} MnO_{3-\delta}$ with a CFL of $La_{0.9}Ca_{0.1} Ni_{0.4} Fe_{0.6} O_{3-\delta}$.

Further examples of cathodes 316 with a composite CFL 316a include a CCL 316b of $(La_{0.8} Sr_{0.2})_{0.98} MnO_{3-\delta}$ with a CFL 316a including 50 wt. % La $Ni_{0.4} Fe_{0.6} O_{3-\delta}$ and 50 wt. % $Ce_{0.8} Sm_{0.2} O_{2-\delta}$, a CCL of $(La_{0.8}Sr_{0.2})_{0.98} MnO_{3-\delta}$ with a CFL including 50 wt. % $LaNi_{0.4} Fe_{0.6} O_{3-\delta}$ and 50 wt. % of 89 mol % $ZrO_2$-10 mol % $Sc_2O_3$-1 mol % $CeO_2$, and a CCL of $(La_{0.8} Sr_{0.2})_{0.98} MnO_{3-\delta}$ with a CFL including 50 wt. % $LaNi_{0.4} Fe_{0.6} O_{3-\delta}$ and 50 wt. % of 88 mol % $ZrO_2$-10 mol % $Sc_2O_3$-1 mol % $Yb_2O_3$-1 mol % $CeO_2$.

If the CCL 316b includes LSCo or LSCF, then CCL 316b may comprise $La_{0.8} Sr_{0.2} Co O_{3-\delta}$, $La_{0.8} Sr_{0.2} Co_{0.4} Fe_{0.6} O_{3-\delta}$, $La_{0.8} Sr_{0.2} Co_{0.2} Fe_{0.8} O_{3-\delta}$, $La_{0.6} Sr_{0.4} Co_{0.4} Fe_{0.6} O_{3-\delta}$, or $La_{0.6} Sr_{0.4} Co_{0.2} Fe_{0.8} O_{3-\delta}$.

The embodiment CFL lanthanum nickel ferrite perovskite material systems may be used in SOFCs, SOECs or in reversible SOFCs which can operate in fuel cell mode to generate power from fuel and air provided to the respective anode and cathode, and in electrolyzer mode to electrolyze water when external electric power is applied to the cell.

SOFCs with a LSM based CCL 316b and lanthanum nickel ferrite based CFL 316a cathodes 316 have been tested in SOFC stacks in a temperature range between 700° C. and 850° C. for various time durations up to 2000 hrs. To evaluate the performance and degradation of the cathodes containing lanthanum nickel ferrite CFL, exemplary cathodes containing lanthanum nickel ferrite based CFL and LSM CCL were tested head-to-head with comparative LSM based cathodes containing a LSM based CFL and a LSM CCL in "rainbow" SOFC stacks that contain both types of SOFCs for direct comparison. In this non-limiting example, comparative "type A" SOFCs containing cathodes with a LSM CCL and CFL including 50 wt. % LSM and 50 wt. % 10Sc1Ce1Yb were compared to exemplary "type B" SOFCs containing cathodes with a LSM CCL and CFL including 50 wt. % La $Ni_{0.4} Fe_{0.6} O_{3-\delta}$ and 50 wt. % 10Sc1Ce1Yb.

The cell degradation is measured in terms of a change in area specific resistance over a given time, and is designated as area specific resistance degradation (ASRD). ASRD is expressed in units of mohm-cm$^2$/khr. Results of stack testing show that the exemplary type B cells had a lower average degradation rate compared to the comparative type A cells, with the median ASRD of exemplary type B cells being ~1.5 mohm-cm$^2$/khr lower than that of the comparative type A cells, as described in greater detail below with reference to FIGS. 6 and 7.

Figure 6:
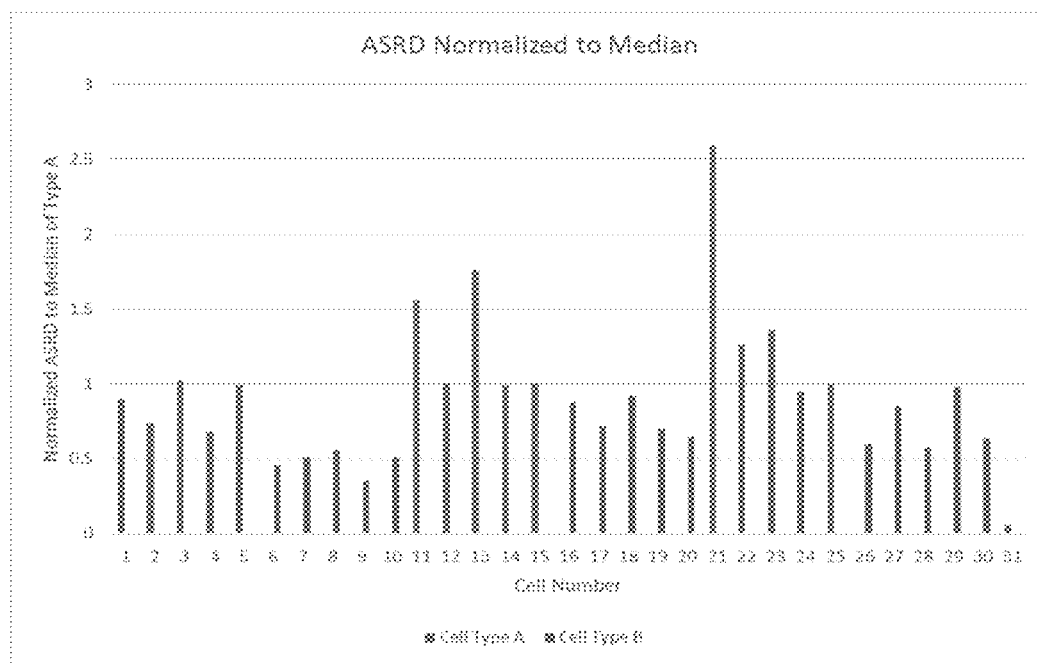
FIG. 6 is a plot of normalized area specific resistance degradation of embodiment cells having lanthanum nickel ferrite based cathode functional layers (CFLs) and of comparative cells having lanthanum strontium manganate based CFLs, according to various embodiments of the present disclosure.

FIG. 6 is a plot 600 of normalized ASRD of SOFCs in a stack containing exemplary type B cell numbers 6 to 10, 16 to 20, and 26 to 30 and comparative type A cell numbers 1 to 5, 11 to 15, 21 to 25, and 31. The normalized ASRD data show that the exemplary type B cells had a lower average ASRD rate compared to the comparative type A cells.

Figure 7:
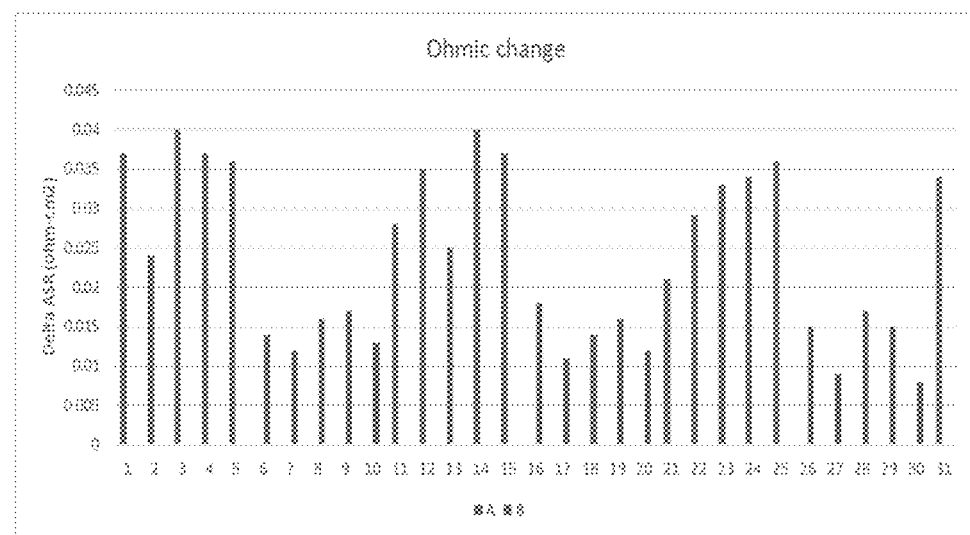
FIG. 7 is a plot of ohmic resistance for the embodiment and the comparative cells of FIG. 6, according to various embodiments of the present disclosure.

FIG. 7 is a plot 700 of ohmic resistance (area specific resistance, ASR) obtained by electrochemical impedance spectroscopy for the SOFCs of the stack of FIG. 6. These measurements show that the lower ASRD of the exemplary type B cells relative to the comparative type A cells is largely ohmic (e.g., due to sheet resistance Rs) in nature. The data characterizes increases in Rs for each cell of the SOFC stack that occurred during operation of the SOFC stack over a 1500 hour time period. As shown in FIG. 7, the exemplary type B cells have a lower increase in Rs compared to the comparative type A cells. The results of FIGS. 6 and 7 thus show improved performance of the exemplary cells compared to the comparative cells.

The foregoing descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step or component of any embodiment described herein can be used in any other embodiment. Fuel cell systems of the embodiments of the present disclosure are designed to reduce greenhouse gas emissions and have a positive impact on the climate.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. A solid oxide electrochemical cell, comprising:
   a solid oxide electrolyte;
   an anode located on a first side of the solid oxide electrolyte; and a cathode functional layer located directly on a second side of the solid oxide electrolyte, the cathode functional layer comprising a mixture of a lanthanum nickel ferrite perovskite material and a non-perovskite ionically conductive ceramic material; and a cathode current collecting layer disposed on the cathode functional layer and comprising a perovskite material.

2. The solid oxide electrochemical cell of claim 1, wherein the cathode functional layer excludes strontium and manganese.

3. The solid oxide electrochemical cell of claim 1, wherein the lanthanum nickel ferrite has a formula $LaNi_{1-y}Fe_yO_{3-\delta}$ where $0.2<y<1$ and $0\leq\delta\leq0.1$.

4. The solid oxide electrochemical cell of claim 3, wherein $0.4<y<0.6$.

5. The solid oxide electrochemical cell of claim 1, wherein the lanthanum nickel ferrite has a formula $La_{1-x}Ca_xNi_{1-y}Fe_yO_{3-\delta}$ where $0.05<x<0.3$, $0.3<y<0.7$, and $0\leq\delta\leq0.1$.

6. The solid oxide electrochemical cell of claim 1, wherein the non-perovskite ionically conductive ceramic material comprises a stabilized zirconia material.

7. The solid oxide electrochemical cell of claim 6, wherein the stabilized zirconia material comprises zirconia stabilized with 9 to 11 mol % scandia, greater than 0 and equal to or less than 3 mol % ceria, and greater than 0 and equal to or less than 2.5 mol % ytterbia.

8. The solid oxide electrochemical cell of claim 1, wherein the non-perovskite ionically conductive ceramic material consists essentially of a doped ceria material.

9. The solid oxide electrochemical cell of claim 1, wherein a weight percent ratio of the lanthanum nickel ferrite perovskite material to the non-perovskite ionically conductive ceramic material is 3:7 to 7:3.

10. The solid oxide electrochemical cell of claim 1, wherein the cathode current collecting layer comprises lanthanum strontium manganite, lanthanum strontium cobaltite or lanthanum strontium cobalt ferrite.

11. The solid oxide electrochemical cell of claim 1, wherein the lanthanum nickel ferrite comprises a perovskite material having a cubic lattice structure.

12. The solid oxide electrochemical cell of claim 1, wherein the solid oxide electrochemical cell comprises a solid oxide fuel cell.

13. The solid oxide electrochemical cell of claim 1, wherein the solid oxide electrochemical cell comprises a reversible solid oxide fuel cell.

14. The solid oxide electrochemical cell of claim 1, wherein the solid oxide electrochemical cell comprises a solid oxide electrolyzer cell.

15. A method of making a solid oxide electrochemical cell, comprising:

providing a solid oxide electrolyte;

forming an anode on a first side of the solid oxide electrolyte; and forming a cathode on a second side of the solid oxide electrolyte, the cathode comprising a cathode functional layer disposed directly on the second side of the solid oxide electrolyte and comprising a mixture of a lanthanum nickel ferrite perovskite material and a non-perovskite ionically conductive ceramic material, and a cathode current collecting layer disposed on the cathode functional layer and comprising a perovskite material.

16. The method of claim 15, wherein:

the lanthanum nickel ferrite has a formula $LaNi_{1-y}Fe_yO_{3-\delta}$ where $0.2<y<1$ and $0\leq\delta\leq0.1$ or $La_{1-x}Ca_xNi_{1-y}Fe_yO_{3-\delta}$ where $0.05<x<0.3$, $0.3<y<0.7$, and $0\leq\delta\leq0.1$; and the cathode current collecting layer comprises lanthanum strontium manganite, lanthanum strontium cobaltite or lanthanum strontium cobalt ferrite.

17. The method of claim 15, wherein the solid oxide electrochemical cell comprises a solid oxide fuel cell or a solid oxide electrolyzer cell.

18. The solid oxide electrochemical cell of claim 1, wherein the cathode current collecting layer covers the entire upper surface of the cathode functional layer.

* * * * *